United States Patent [19]

Mullet et al.

[11] 4,266,617
[45] May 12, 1981

[54] TRACTOR WITH FULL-FLOATING TOOL BAR

[75] Inventors: David L. Mullet, Hesston; Raymond J. Rilling, Moundridge; Elmer D. Voth, Newton, all of Kans.

[73] Assignee: Excel Industries, Inc., Hesston, Kans.

[21] Appl. No.: 14,291

[22] Filed: Feb. 23, 1979

[51] Int. Cl.³ .................. A01B 59/048; A01B 63/108; B60K 9/00

[52] U.S. Cl. ........................................ 172/76; 37/41; 56/11.9; 56/15.1; 56/15.6; 56/15.8; 172/74; 172/114; 172/117; 172/292; 172/452; 172/458; 172/459; 172/478; 172/834; 180/2 R; 180/6.48; 180/54 D; 180/299; 180/306

[58] Field of Search ............... 172/76, 77, 111, 114, 172/117, 245, 247, 248, 250, 276, 74, 277, 800, 292, 297, 298, 308, 452, 458, 459, 478, 501, 801; 56/10.7, 10.6, 14.9, 15.1, 15.6, 11.9, 15.7, 15.8, 15.9, 16.7; 180/2 R, 6.48, 54 D, 291, 295, 305, 306, 307, 308, 299; 37/12, 41, 43, 42

[56] References Cited

U.S. PATENT DOCUMENTS

| | | | |
|---|---|---|---|
| 910,162 | 1/1909 | Barbee | 172/501 X |
| 1,669,787 | 5/1928 | Shaw | 280/481 |
| 2,512,733 | 6/1950 | Andersen et al. | 172/478 X |
| 2,691,262 | 10/1954 | Swertfeger | 172/78 X |
| 3,056,458 | 10/1962 | Gray | 172/501 X |
| 3,118,266 | 1/1964 | Colburn | 56/15.8 X |
| 3,329,225 | 7/1967 | Dunn | 280/481 X |
| 3,509,721 | 5/1970 | Crawford | 180/308 X |
| 4,124,079 | 11/1978 | Crow | 172/114 |
| 4,180,282 | 12/1979 | Henning | 280/481 |

Primary Examiner—Paul E. Shapiro
Attorney, Agent, or Firm—John A. Hamilton

[57] ABSTRACT

A tractor having a frame supported by ground-engaging drive wheels, a tool bar carried by the tractor and on which various implements may be mounted, the tool bar being universally mounted on the frame whereby the implement may be raised above or lowered to the ground, and can follow the contour of the ground, a power unit also mounted on the tool bar so as to have a direct driving connection to the implement not affected by the universal "floating" movement of the implement and tool bar, and a driving connection between the power unit and the drive wheels, of a type not affected by the relative movability of the tool bar and tractor frame, in order that both the implement and the tractor may be driven by a single power unit. Mechanism is also provided for pivoting the tool bar to elevate the implement above the ground when desired, for supporting the tool bar while implements are changed, and for holding the implement firmly against the ground when required.

3 Claims, 4 Drawing Figures

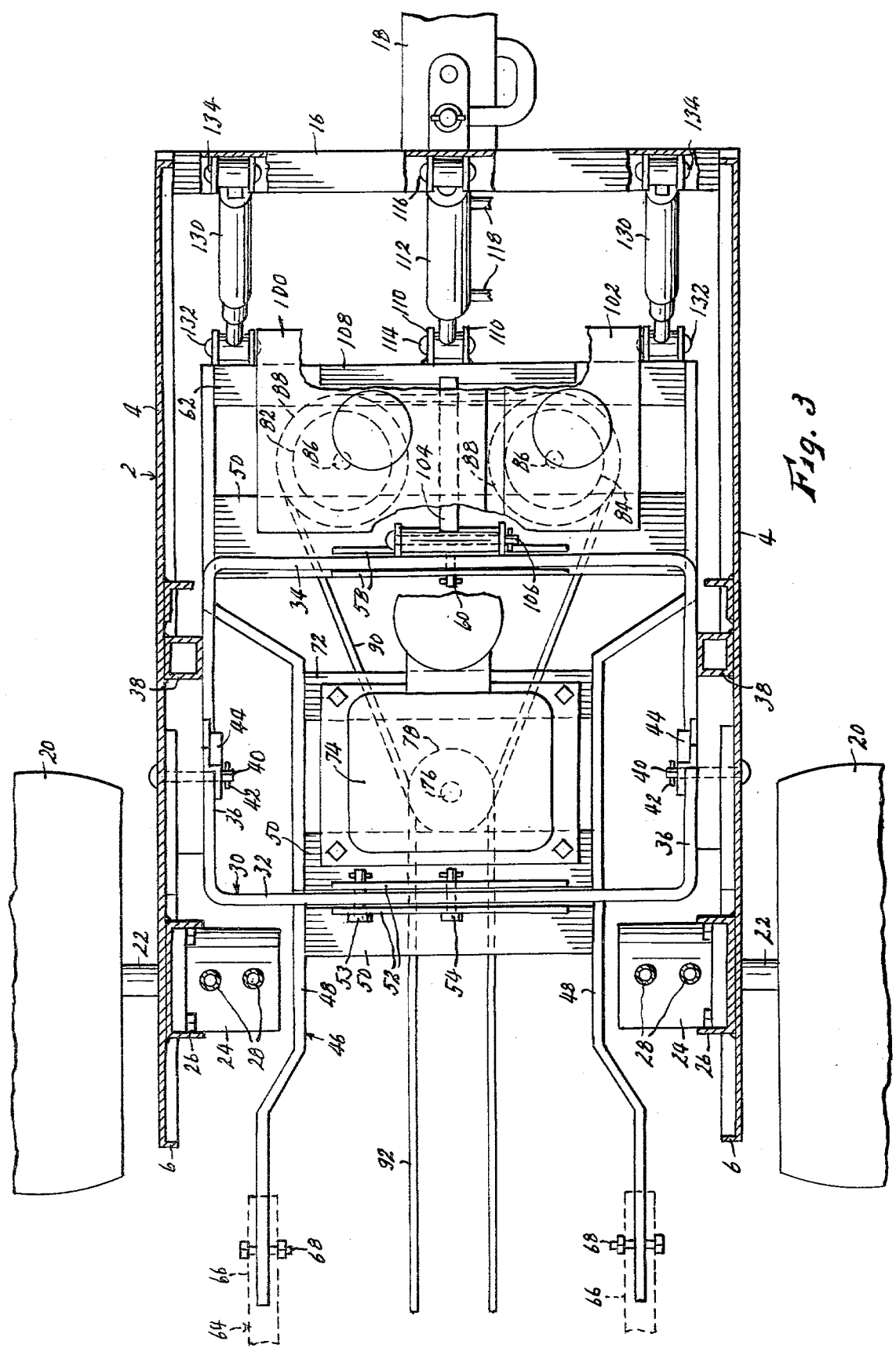

TRACTOR WITH FULL-FLOATING TOOL BAR

This invention relates to new and useful improvements in tractors, and has particular reference to that class of small tractors which are commonly used for carrying and operating various types of useful implements, such for example as grass mowers of various types, snow throwers or snow plows, bulldozer blades, etc. Usually such implements are interchangeably mountable on the tractor, in order to increase the utility and versatility of the system. More specifically, this invention relates to the support of the tool bar, on which the implements are interchangeably mounted, relative to the frame of the tractor, and to the nature and disposition of the power unit used both to drive the tractor itself, and also to drive any elements of the implement requiring a power drive.

In implement tractors of the type described, the internal combustion engine or other power unit is customarily mounted in the frame of the tractor itself. On the other hand, the implement must nearly always be movable relative to the tractor frame, as by being mounted on a tool bar of the tractor which is itself movable relative to the tractor frame, both for the purpose of either lowering the implement into operative relationship to the ground or elevating it above the ground for transport, and also for allowing certain types of implements, such as grass mowers, to freely follow the ground contour despite uneven terrain, both longitudinally and laterally of the direction of tractor travel. Heretofore, within our knowledge, this has necessitated a relatively involved and expensive driving connection between the power unit and the implement, such as a drive shaft which is both longitudinally extensible and also equipped with universal joints.

Accordingly, a primary object of the present invention is the provision of a tractor of the character described having a tool bar pivoted in its frame on a horizontal transverse axis, with both the implement and the power unit mounted directly on said tool bar. With these two elements thus mounted in spatially fixed relation relative to each other, the driving connection therebetween may be direct and inexpensive, such as a simple belt drive.

Another object is the provision of a tractor device of the character described wherein the weights of the implement and of the power unit are centered respectively forwardly and rearwardly of the transverse pivotal axis of the tool bar, whereby the latter at least partially counter-balances the former, and reduces the power required to pivot the tool bar.

A further object is the provision of a tractor device of the character described wherein the tool bar is also freely pivotal transversely of the tractor on a longitudinal axis. This permits implements such as grass mowers to follow transverse irregularities of the ground contour, in order to cut grass at a more uniform height.

Still another object is the provision of a tractor device of the character described in which the tool bar, though normally freely pivotal about both lateral and longitudinal axes, is also provided with a control device whereby it may selectively be pivoted on its transverse axis to elevate the implement above the ground for transport, and in so doing to level and lock it against pivoting on its longitudinal axis, may be positively locked against movement on its transverse axis while the implement is removed or changed, and may be pivotally biased about its transverse axis to hold the implement firmly against the ground, whenever the implement is of a type, such as a bulldozer blade, requiring such hold-down pressure.

A still further object is the provision of a tractor device of the character described having a drive connection between the power unit mounted on the tool bar, and the tractor drive wheels mounted on the tractor frame, of a type not affected by the variable spatial relation between the tool bar and the wheels. Generally, this object is accomplished by the provision of hydraulic pumps mounted on the tool bar and driven by the power unit, and hydraulic motors mounted on the frame and operable to drive the wheels, the connections between the pumps and motors consisting of flexible hoses.

Other objects are simplicity and economy of structure, and convenience, efficiency and dependability of operation.

With these objects in view, as well as other objects which will appear in the course of the specification, reference will be had to the accompanying drawing, wherein:

FIG. 3 is a sectional view taken on line III—III of FIG. 2, and

FIG. 4 is an enlarged, fragmentary sectional view taken on line IV—IV of FIG. 2.

Figure 1:
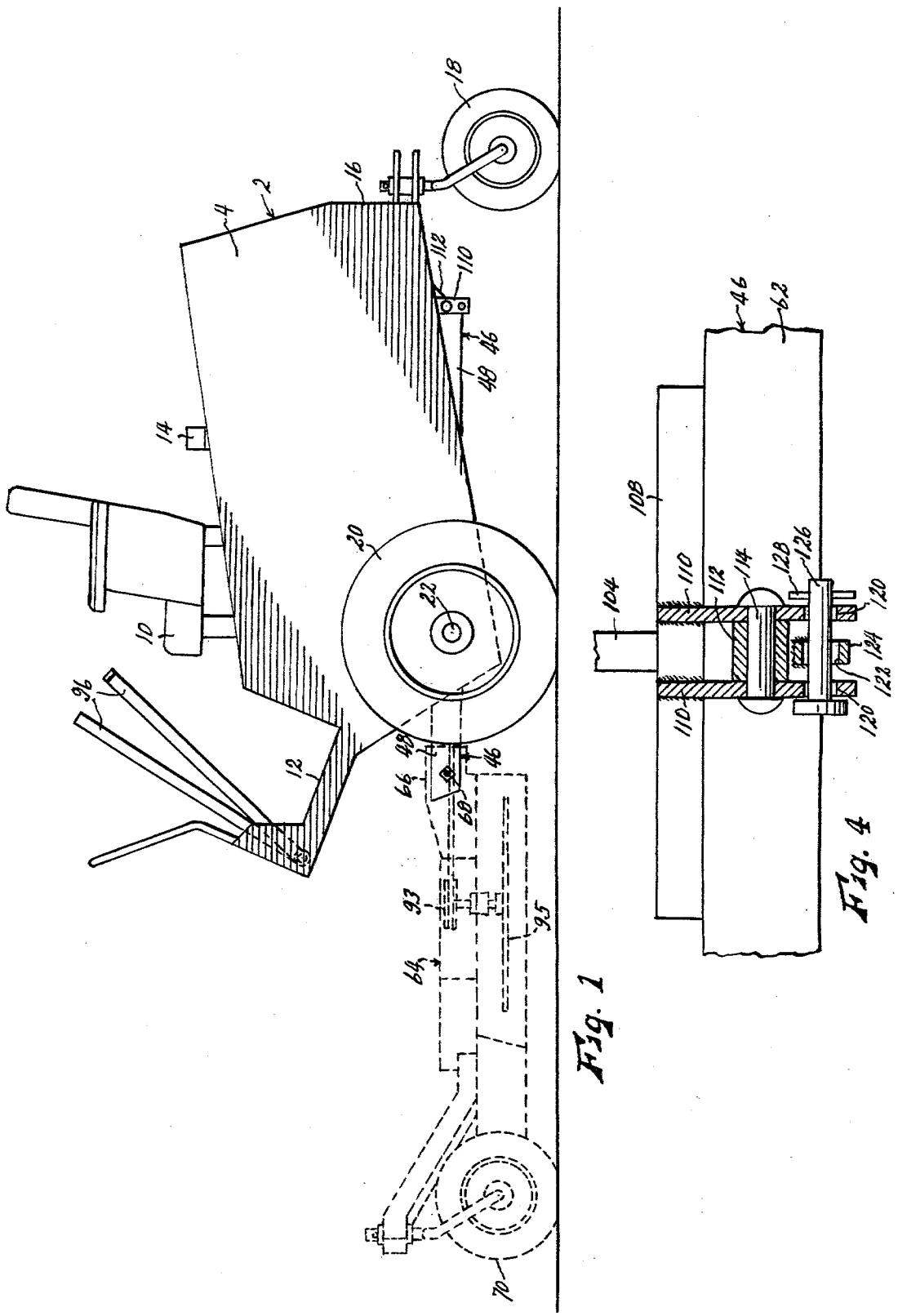
FIG. 1 is a side elevational view of a tractor embodying the present invention, with a grass mower deck shown in dotted lines attached thereto as an example of an implement usable therewith.

Like reference numerals apply to similar parts throughout the several views, and the numeral 2 applies generally to the frame of a tractor embodying the present invention, said frame including a pair of vertically disposed side walls 4 formed of plate stock and reinforced by inturned flanges 6 around their edges, and connected rigidly together at their upper forward portion by a transverse horizontal shelf 8 on which is mounted a driver's seat 10, and also forming a footboard 12 for the driver, by a transverse cross bar 14 extending transversely behind the seat, and by a cross member 16 at their rearward ends. Cross member 16 carries a castered rear ground-engaging wheel 18 for supporting the rearward end of the frame.

Adjacent its forward end, the frame is supported by a pair of coaxial ground-engaging drive wheels 20 disposed respectively at opposite sides of the frame. The axle 22 of each wheel extends horizontally inwardly through the associated side wall 4 of the frame, and is driven by a reversible hydraulic motor 24 fixed to a channel iron post 26 welded to the inner surface of said side wall. Each motor is supplied by a pair of flexible hydraulic hoses 28, and as will appear are independently controlled, so as to provide forward movement of the tractor by rotation in one direction, to provide rearward movement of the tractor by rotation in the opposite direction, and to provide steering of the tractor by rotation at unequal speeds.

Mounted within frame 2 is a sub-frame 30 formed of heavy bar stock and having the form of an open rectangle including a front bar 32, rear bar 34 and side bars 36. Side bars 36 are parallel with and adjacent side frame walls 4, and each is pivoted on a horizontal transverse axis, intermediate its ends, to a structural member 38 welded to the inner surface of the adjacent side wall, as by a pivot pin 40 secured by a cotter key 42. The two pivot pins 40 are coaxial. The side bars 36 of the sub-frame 30 contact structural members 38 of frame 2, and members 38 have affixed thereto brackets 44 which bridge members 36 to engage the inner surfaces thereof, and to receive pins 40. The sub-frame thus serves as a tie between the lower edge portions of walls 4 to preserve a proper spacing therebetween.

Sub-frame 30 in turn supports a tool bar designated generally by the numeral 46, and extending forwardly and rearwardly in spaced apart relation below said sub-frame. Said tool bar comprises a pair of laterally spaced apart side bars 48 extending forwardly to a point just forward of drive wheels 20, and terminating at their rearward ends forwardly of rear frame cross member 16. Bars 48 are rigidly connected together by various cross bars to be described. At the forward edge of sub-frame 30, a pair of cross bars 50 of the tool bar are provided with upstanding flanges 52 between which front bar 32 of the sub-frame is disposed, and is pivoted to said flanges by a pivot pin 54 disposed horizontally at right angles to pivot pins 40 of the sub-frame, in the vertical midplane of the tractor. Similarly, at the rearward edge of the sub-frame, the tool bar is provided with a cross bar 56 having upstanding flanges 58 embracing rear bar 34 of the sub-frame, and pivoted thereto by pivot pin 60. Pivot pins 54 and 60 are coaxial. Thus the tool bar is "hung in gimbels" relative to the tractor frame, and may pivot universally relative thereto by virtue of transverse pivot pins 40, and longitudinal pivot pins 54 and 60. Tool bar side bars 48 are connected at their rearward ends, rearwardly of the sub-frame but forwardly of rear frame cross member 16, by a cross bar 62.

Figure 2:
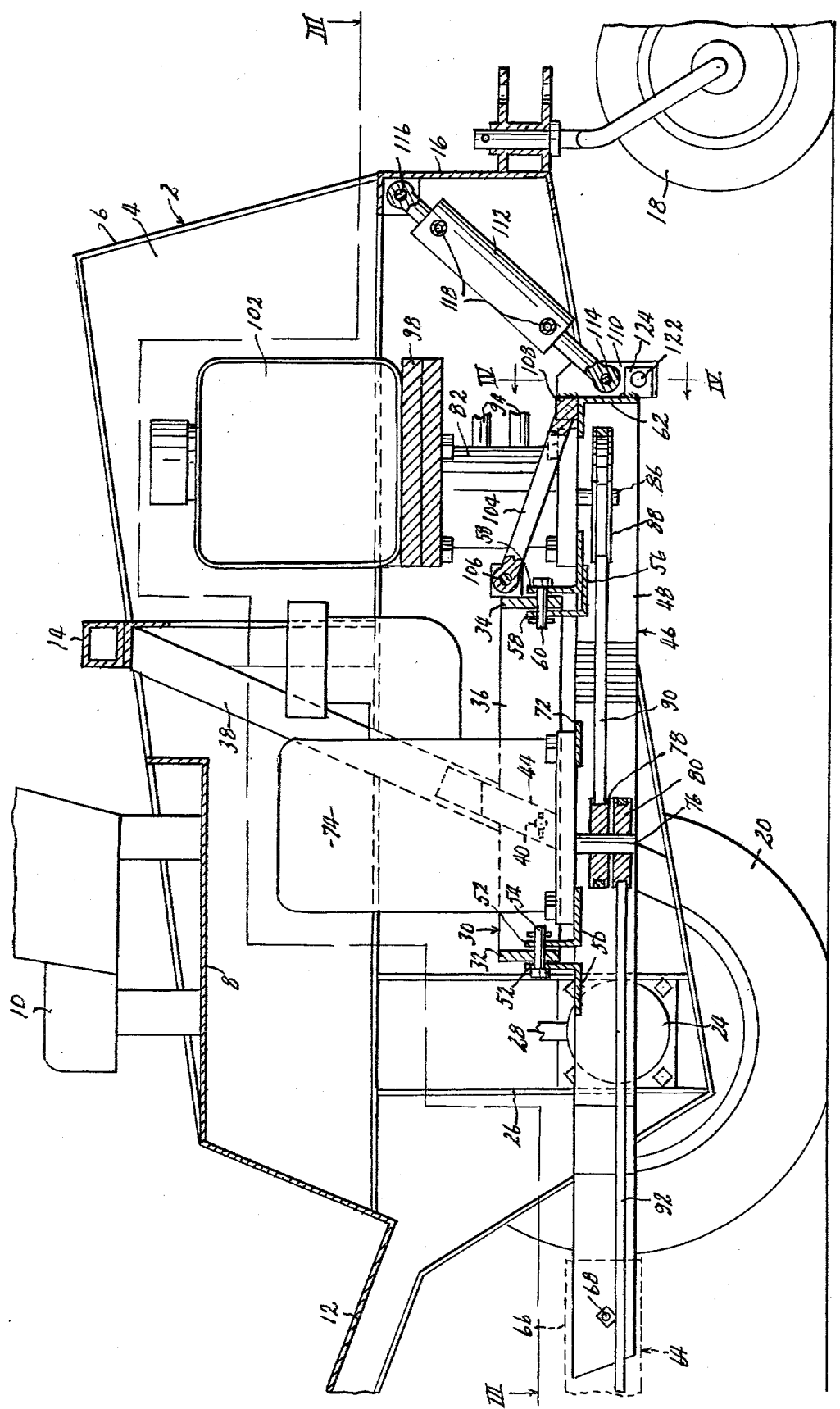
FIG. 2 is an enlarged, fragmentary, vertical mid-sectional view of the tractor as shown in FIG. 1, with parts left in elevation.

Tool bar 46 may have an implement 64 attached to its forward end by any suitable means, as for example by providing the implement with sleeves 66 which engage rearwardly over the forward ends of side bars 48, with bolts 68 inserted through matching holes of the sleeves and bars. The implement selected for illustration only is a grass mower deck having blades, one shown, which must be driven by power means, and having its own castered front wheels 70 (one shown), at its forward edge. Mounted on cross bars 50 and 72, within the front-to-rear span of sub-frame 30, is a prime mover 74, which may constitute a gasoline engine, and which projects upwardly through the sub-frame but does not touch or engage it. Said engine has a downwardly projecting vertical drive shaft 76, on which are affixed a pair of belt pulleys 78 and 80. Rearwardly of the sub-frame, a pair of hydraulic pumps 82 and 84 are mounted in side by side relation on cross bars 50 and 62 of the tool bar. As best shown in FIG. 2, the input drive shafts 86 of the pumps extend vertically downwardly, and each has a belt pulley 88 affixed thereon, pulleys 88 being operably connected to and driven by engine pulley 78, by means of a belt 90. Engine pulley 80 is operably connected by a belt 92 to a cooperating pulley 93 constituting an element of implement 64, whereby to drive the mower blades 95 if the implement is a mower, or other operating elements in the case of other implements. Pumps 82 and 84 are each operable to drive one of the hydraulic motors 24 powering the drive wheels, each having flexible hydraulic hoses 94 connectable with the hoses 28 of the associated hydraulic motor. The hydraulic system may be standard and is not shown, each pump 82 and 84, and the associated valving, being controlled by one of a pair of control levers 96 (see FIG. 1) accessible to and movable by a driver occupying seat 10, whereby the drive wheels 20 may be independently controlled as to speed and direction of rotation. The two pumps 82 and 84 support a shelf 98 on which is mounted a fuel tank 100 for engine 74, and a reservoir tank 102 for the hydraulic system.

As a control for the tool bar when "full-floating" universal pivoting thereof is not desired, there is provided a bar 104 pivoted at its upper end to rear bar 34 of sub-frame 30 on a horizontal transverse axis, as at 106. Bar 104 is inclined downwardly and rearwardly from its pivot, and is affixed at its lower end to the midpoint of a horizontal, transversely extending hold-down bar 108 which overlies the top surface of rear cross bar 62 of the tool bar. A pair of horizontally spaced apart plates 110 are welded to the rearward edge of the hold-down bar so as to extend downwardly at the rearward edge of cross bar 62, but are not affixed to said cross bar. One end of a double-acting hydraulic ram 112 is pivoted between plates 110 on a horizontal transverse axis, as at 114. The ram is inclined upwardly and rearwardly, and is similarly pivoted at its upper end, as at 116, to rear cross member 16 of frame 2. The ram is provided with the usual hydraulic hoses 118, being driven by one of pumps 82 or 84, and provided with the usual controls, not shown, accessible to the tractor driver. When the ram is retracted to elevate hold-down bar 108 above cross bar 62 of the tool bar, the tool bar is free to pivot universally, as described. When the ram is extended to engage the hold-down bar with cross bar 62, as shown, or still further, the hold-down bar depresses the rearward end of the tool bar to elevate implement 64 out of contact with the ground for transport. Also, as hold-down bar 108 is depressed, its transversely wide engagement with cross bar 62 levels the tool bar transversely by pivoting it on its longitudinal pivots 54 and 60, so that it cannot pivot transversely when elevated. Plates 110 to which ram 112 is pivoted at 114 are provided, below pivot 114, with matching holes 120 (see FIG. 4) which, when hold-down bar 108 is in engagement with cross bar 62 of the tool bar, register with a hole 122 formed in a bracket 124 affixed to cross bar 62. A retainer pin 126 may then be inserted through holes 120 and 122, and secured by a cotter key 128, for a purpose to be described hereinbelow. At each of its rear corners, tool bar 30 is connected to tractor frame 2 by a heavy-duty shock absorber 130 arranged similarly to ram 112, being pivoted at its lower forward end to rear cross bar 62 of the tool bar, as at 132 (see FIG. 3), and at its upper rear end to rear cross member 16 of frame 2, as at 134.

In operation, it will be seen that with retainer pin 126 removed and with hydraulic ram 112 retracted to elevate hold-down bar 10 above rear cross bar 62 of the tool bar, said tool bar may "float" freely relative to tractor frame 2, with front wheels 70 of implement 64 resting on the ground by gravity. That is, the implement may move vertically relative to the frame by motion of the tool bar on transverse pivot pins 40, and may tilt transversely of the tractor by motion of the tool bar about longitudinal pivot pins 54 and 60. This permits the implement to follow accurately any irregularity or unevenness of the ground contour, which in the case of a mower provides for cutting of the grass at a more even and uniform height. In any such universal pivoting movements of the tool bar, the spatial relationship between implement 64 and any power unit mounted directly in tractor frame 2 would vary, and this in turn would require a more or less involved and expensive drive connection from the power unit to the implement, such as a slidably extensible drive shaft equipped with universal joints. In the present device, however, the power unit, namely engine 74, is mounted directly on the tool bar and hence duplicates its movements, and this in turn permits the use of a direct, simple power connection, such as belt 92, since there is no change in the spatial relationship between the implement and the engine. If the particular implement being used does not have elements requiring power operation, belt 92 is not used. Depending on the internal arrangement of implement 64, particularly the disposition of the belt pulley therein engaged by belt 92, each implement 64 may require its own particular belt 92. An idler pulley, not shown, may be carried for manual movement, under the control of the driver, toward and from a reach of belt 92, whereby to tighten or loosen said belt as desired, whereby to serve effectively as a clutch for connecting or disconnecting implement 64 to or from the engine. This would be useful in permitting the engine to continue to operate to propel the tractor, but to deactivate the implement whenever desired, particularly when the implement is elevated above the ground for transport. However, such belt clutches are old and well known in the art.

The hydraulic pumps 82 and 84 for turning tractor drive wheels 20, and also for powering ram 112, are also mounted directly on the tool bar in order to permit a simple, direct belt drive of said pumps by the engine. This of course results in a variation in the spatial relationship between the pumps and wheels 20 as the tool bar pivots, but this variation is permitted and accommodated by the fact that the hydraulic connections between said pumps and the hydraulic motors 24 mounted on the frame for driving wheels 20 are accomplished entirely by means of flexible hoses 28 and 94.

When it is desired to elevate implement 64 above the ground, as for transport, ram 112 is extended to lower hold-down bar 10 into engagement with rear cross bar 62 of the tool bar, and still further. The portion of the weight carried by the tool bar forwardly of its transverse pivots 40, principally implement 64 itself, is almost always substantially greater than the weight carried by the tool bar behind said transverse pivots, which constitutes the weight of tanks 100 and 102, pumps 82 and 84, and a portion of the weight of engine 74. Thus the balance of these weights normally biases the rearward end of the tool bar upwardly, but the downward pressure of hold-down bar 108 forces the rearward end of the tool bar downwardly, thereby elevating implement 64 above the ground for transport. Also, since hold-down bar 108 is anchored to sub-frame 30, which does not tilt laterally of the tractor, and has a laterally broad contact with rear cross bar 62 of the tool bar, it tilts the tool bar laterally on its longitudinal pivots 54 and 60 to level it transversely as it elevates the implement, thereby locking said tool bar in a laterally level position whenever implement 64 is elevated. Thus uncontrolled lateral tilting of the implement is prevented.

Retainer pin 126, when inserted, connects the tool bar directly to hydraulic ram 112, and may be used in any one of several circumstances. For example, it may be used to support the rearward end of the tool bar whenever implement 64 is to be detached from its forward end, as when interchanging one implement for another. The weight carried by the rearward portion of the tool bar is quite substantial, and must be positively supported when not counterbalanced by the weight of an implement. With pin 126 inserted, retraction of the ram exerts upward force on the rearward end of the tool bar, and hence urges implement 64 positively downwardly against the ground. This hold-down force is necessary or desirable when using certain implements, such as bulldozer blades, although of course the force should not be so great as to lift drive wheels 20 from the ground, or materially reduce their ground traction. The retainer pin may also be used, for positive control of the tool bar, with any implement not equipped with its own ground-engaging wheels 70, or in the unlikely but possible circumstance that a particular implement should be so light in weight as to be incapable of overbalancing the weight of the elements carried by the rearward portion of the tool bar. Of course, whenever retainer pin 126 is inserted, the tool bar is under positive control by ram 112, and is not "full-floating" as it is when said pin is removed and hold-down bar 108 lifted out of contact with the tool bar.

It will be seen that the pivot pins 40, which support the weight of tool bar 46 and the elements mounted thereon from tractor frame 2 are disposed forwardly in the frame, much closer to the axis of front drive wheels 20 than to rear wheel 18. This fact results from the desire to dispose implement 64 forwardly of the tractor, where its operation may be readily observed by the driver, but also results in the fact that only a small proportion of the total weight is supported by rear wheel 18. As a result, said rear wheel would have a tendency to "bounce" more or less freely out of contact with the ground, particularly when traversing uneven terrain at relatively high speeds, were it not for shock absorbers 130. Said shock absorbers connect the rearward end of frame 2 yieldably to the tool bar, which represents a substantial portion of the total tractor weight, and by their resistance to sudden extension they resist any sudden upward movement of the rearward end of the frame.

A lock pin 53 similar to pivot pin 54 may be detachably inserted through flanges 52 and front bar 32, in spaced apart relation from pin 54, to lock the tool bar against lateral tilting in the event this action is not desired (see FIG. 3).

While we have shown and described a specific embodiment of our invention, it will be readily apparent that many minor changes of structure and operation could be made without departing from the spirit of the invention.

What we claim as new and desire to protect by Letters Patent is:

1. A tractor operable to carry and operate a useful implement, and comprising:
   a. a frame,
   b. front and rear ground-engaging wheels carried by and supporting said frame, at least certain of said wheels being power-driven whereby to propel said tractor,
   c. a generally horizontal tool bar extending longitudinally in said frame, and pivoted to said frame intermediate its ends on a horizontal transverse axis disposed intermediate the front and rear wheels of said frame, and also for pivotal movement about an axis longitudinal thereto and at right angles to its horizontal transverse axis, whereby said tool bar is universally pivotable relative to said frame, d. means connecting said implement detachably to the forward end of said tool bar, the universal pivotability of said tool bar permitting said implement to follow accurately unevenness of the ground contour both longitudinally and laterally of the line of travel of the tractor, said implement being of sufficient weight to overbalance the forward end of said tool bar downwardly and being provided with its own ground-engaging wheels,
e. a hold-down member carried by said tractor frame and normally spaced above the rearward end of said tool bar whereby to permit free universal tilting of said tool bar,
f. power means carried by said frame and operable to lower and press said hold-down member downwardly against the rearward end of said tool bar, whereby to pivot said tool bar to elevate said implement above the ground, said hold-down member engaging said tool bar at both sides of its longitudinal pivotal axis whereby to level it on said axis,
g. a prime mover mounted on said tool bar, and
h. drive means operably interconnecting said prime mover to said implement.

2. A tractor as recited in claim 1 with the addition of retainer means operable to secure said hold-down member detachably against said tool bar, whereby said power means is rendered operable to both raise and lower the rearward end of said tool bar.

3. A tractor operable to carry and operate a useful implement, and comprising:
   a. a frame,
   b. front and rear wheels carried by and supporting said frame, at least certain of said wheels being power-driven whereby to propel said tractor,
   c. a generally horizontal tool bar extending longitudinally in said frame, and pivoted to said frame intermediate its ends on a horizontal transverse axis disposed intermediate the front and rear wheels of said frame, but relatively closer to the front tractor wheel axis than to the rear wheel axis
   d. a shock absorber the axis of which has a vertical component, and connected at its respective ends to the rearward end of said tool bar and to said tractor frame,
   e. a prime mover mounted on said tool bar, and
   f. drive means operably interconnecting said prime mover to said implement.

* * * * *